Aug. 3, 1943.                E. J. DILLMAN                2,326,096
                      THERMOSTATIC CONTROL DEVICE
                          Filed May 8, 1941

INVENTOR
Earnest J. Dillman
BY
Andrew K. Foulds
his Attorney

Patented Aug. 3, 1943

2,326,096

UNITED STATES PATENT OFFICE 2,326,096

THERMOSTATIC CONTROL DEVICE

Earnest J. Dillman, Detroit, Mich., assignor to Detroit Lubricator Company, Detroit, Mich., a corporation of Michigan Application May 8, 1941, Serial No. 392,478

9 Claims. (Cl. 236—12)

This invention relates generally to thermostatic controlling means and more particularly to means for regulating the temperature of a discharged fluid and is particularly adapted among other uses for a mixing valve for hot water systems.

An object of this invention is to provide an improved fluid mixing valve for hot water systems so that irrespective of the temperature of the hot water source the temperature of the supplied hot water will not become so hot as to cause bodily injury.

Another object is to provide such a valve which will maintain the temperature of the supplied hot water substantially constant.

Another object is to provide in such a valve, a positively seating flow controlling means for controlling flow of the cold water.

Another object is to provide such a valve which is free from objectionable noises due to rapid closing and opening of the cold water controlling means.

Another object is to provide in such a valve, means for rendering the temperature regulating mechanism more sensitive at low rates of fluid output.

Other objects will be apparent from a reading of the specification and the appended claims.

The invention consists in the improved construction of and combination of parts, to be more fully described hereinafter and the novelty of which will be particularly pointed out and distinctly claimed.

In the accompanying drawing, to be taken as a part of this specification, there is fully and clearly illustrated a preferred embodiment of the invention, in which drawing.

Figure 2:
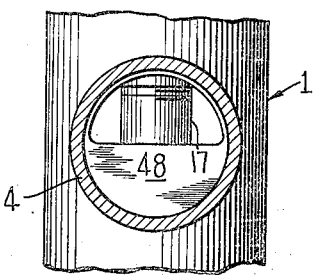
Fig. 2 is a view taken substantially along the line 2—2 of Fig. 1.
Figure 3:
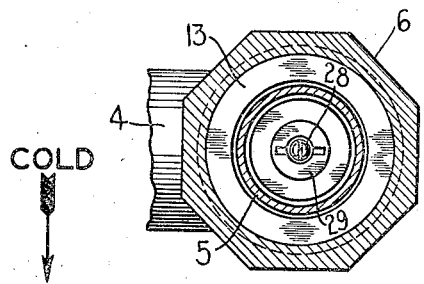
Fig. 3 is a view taken substantially along the line 3—3 of Fig. 1.

Referring to the drawing by characters of reference the numeral 1 indicates a hollow tubular casing having aligned oppositely extending end portions or arms 2 and 3 and a hollow tubular portion or leg 4 extending perpendicularly to the axis of and opening into the interior of the casing 1 and positioned substantially midway between the end portions 2 and 3. The opening through arm 2, forming an outlet from the casing 1, is internally threaded for reception of a suitable conduit for communicatively connecting the casing 1 to a hot water distributing system (not shown). The cold water supply (not shown) is connected by a conduit (not shown) to a flanged pipe fitting 5 which is held to the arm 3 by means of a nut 6 screw-threadedly secured to the arm 3 and having its internal shoulder 7 abutting the flange of the fitting 5. A packing washer 8 is positioned against the end wall of the arm 3 and a packing washer 9 is positioned against the end wall of the fitting 5 which extends toward the arm 3. A cup-shaped plate member 10 having a bottom wall 11 with a central aperture therethrough and having a side wall 12 has an outwardly extending flange or lip portion 13 which is received between the washers 8 and 9. The nut 6 acts to clamp the fitting 5, the plate member 10, and the washers 8 and 9 to the arm 3 in a fluid tight manner.

A hollow tubular member 14 has its upper end portion securely and fluid tightly held in a suitable manner within the central aperture of the bottom wall 11 and extends downwardly within a chamber 15 formed within the interior of the casing 1. The lower end portion of the member 14 is internally threaded at 16 for threaded reception of the upper end of a second tubular member or extension 17. The upper end of the member 17 has a centrally apertured end wall 18 which abuts a downwardly facing internal shoulder within the lower end portion of member 14 to limit the screw-threaded movement of the member 17 thereinto. The lower end of the member 17 is enlarged to form a cone frustum 19 and has an outwardly extending radial flange 20 at the base of the frustum 19. A cup-shaped member 21 has its bottom wall 22 positioned adjacent to, but spaced from, the threads of the arm 2, and has at its upper or open end portion an outwardly extending flange portion forming a shoulder 23. A diaphragm 24 preferably of rubber or "Neoprene" has its peripheral portion seating against the shoulder 23 and is of substantially the same diameter as the diameter of the flange portion 20 of the tubular member 17. The marginal portion of the flange portion of the cup-shaped member 21 is rebent about the diaphragm 24 and flange 20 to clamp the diaphragm 24 against the shoulder 23 to seal the interior of the member 21 and to hold the member 21 and diaphragm 24 securely to the lower end of the tubular member 17.

The cup-shaped member 21 contains a pellet 25 of a temperature sensitive material to form a temperature sensitive power element 25ᵃ. The temperature sensitive material acts upon temperature change to increase and decrease in volume due to its fusion. The pellet 25 does not completely fill the entire space below the diaphragm 24 and a concave upwardly disk 25ᵇ is positioned on the top surface of the pellet 25 facing the diaphragm 24 and acts to prevent the pellet 25 from actually engaging the diaphragm to prevent any undesired reactions between the material of which diaphragms and the pellets are fabricated. The remaining space within the cup-shaped member 21 below the diaphragm 24 is filled with a liquid which may be, for example, ordinary distilled water.

Abutting the upper surface of the diaphragm 24 is the lower end surface of a piston member 26 which has a piston fit with, and is reciprocal within, the tubular member 17. A passageway 27 has one end opening through the lower end surface of the piston member 26 and has its other end opening through the side wall of the piston member 26 adjacent the lower end surface. A rod or thrust member 28 has its lower end portion screw-threadedly secured within a threaded aperture in the upper portion of the piston member 26 and extends upwardly therefrom through the central aperture in the end wall 18 and beyond the upper end of the tubular member 14. A valve member 29 in the shape of a cone frustum has a central threaded aperture for threaded connection to the threaded upper end portion of the thrust member 28. The tapered side walls of the valve member 29 are engageable with a valve seat 30 formed by the inner periphery of the tubular member 14 for stopping flow from the cold water supply to the chamber 15. Upon movement of the valve member 29 upward away from the seat 30, cold water is permitted to flow through the hollow interior of the tubular member 14 and through diametrically positioned openings 31 in the side wall of the member 14 into chamber 15. The diametrically positioned openings 31 act to discharge the cold water admitted by the valve member 29 so that the cold water will be distributed about the diameter 15 and will readily mix with the hot water admitted through the leg 4. The thrust member 28 is guided within a central aperture of an inverted cup-shaped member 32 which is press fitted into the hollow interior of the tubular member 14 against the end wall 18. The member 32 also serves to deflect the flow of cold water through the openings 31 into the chamber 15. A helical coil spring 33 is positioned within the tubular member 17 concentric with the thrust member 28 and has its upper end abutting against an apertured disk through which the thrust member 28 extends and which is positioned against the end wall 18. The lower end of the spring 33 abuts against an annular disk 34 which is in engagement with a packing 35 and acts to hold the packing 35 against the piston member 26 in fluid tight relationship with the inner wall of the member 17. The spring 33 also acts to urge the piston member 26 into engagement with the diaphragm 24. The space above the diaphragm 24 and below the packing 35 is filled with a suitable liquid such as distilled water to prevent osmosis flow through the diaphragm 24. The passageway 27 allows any of the water which may be caught between the lower surface of the piston member 26 to escape so that the piston member 26 will always seat directly on the diaphragm 24. The upper end of the thrust member 28 is slotted for reception of a suitable tool for rotation thereof so that it may be screw-threaded to the piston member 26. The member 28 is held against the undesired rotation subsequent to assembly due to the end portion thereof seating against the bottom of the screw-threaded aperture in the piston member 26 and also by the friction between the threads. The base portion of the frustum of the valve member 29 is also slotted for reception of a suitable tool such as a screwdriver so that the valve member 29 may be positioned relative to its seat 30 thereby to adjust the temperature of the tempered water supplied to the distributing system. One method by which this adjustment may be made is to remove the power element 25ª together with members 10, 14 and 17 by removing the nut 6 and fitting 5 and immersing the element 25ª in water of the same temperature which is to be supplied to the distributing system which for purposes of illustration will be assumed to be 130° F. The valve member 29 is then screwed onto the thrust member 28 until it just engages the seat 30 and is then sealed to the member 28 in position as by solder (as shown) or by staking.

Hot water is conducted from a suitable supply, and which supply is preferably at substantially the same pressure as the cold water, through a conduit (not shown). The hot water supply conduit is connected to the casing 1 in a manner similar to that by which the cold water conduit is connected to the casing 1 and includes a fitting 36, a nut 37, and packing washers 38 and 39. A cup-shaped plate member 40 held between the washers 38 and 39 differs from the plate member 10 in that it has a plurality of apertures 41 therethrough spaced from a central aperture 42. A disk valve 43 is positioned against the outer surface of the plate member 40 away from the fitting 36 and covers the apertures 41 and 42. A thrust member or rod 44 having one end portion secured in a suitable manner to the center of the disk valve 43 extends through and is guided for reciprocal movement in the central aperture 42. The other end portion of the rod 44 is screw-threaded and has secured thereto a nut 45. A spiral spring 46 has its base portion abutting the bottom wall of the plate member 40 and has its apex portion abutting the nut 45 and acts to hold the disk valve against the plate member 40 to prevent flow of hot water into the chamber 14.

The casing 1 has an inwardly extending annular baffle 47 forming a shelf-like protuberance extending into the chamber 15 from the side walls thereof and is positioned intermediate the bottom wall 22 of the cup-shaped member 21 and the shoulder 23. The baffle 47 forms a throat and serves to deflect and direct the intimately blended and mixed water streams against the responsive element 25ª to enhance its response to temperature change. Preferably the baffle 47 has a less internal diameter than the external diameter of the flange portion of the cup-shaped member 21 so that more of the water flowing through the chamber 15 will be brought into contact with the member 21 for more accurate temperature control. Hot water flowing through the apertures 41 must escape around the periphery of the disk valve 43 and a turbulent flow results. A dam 48 partially closes the opening of the tubular portion into the chamber 15 to increase the turbulence of the hot water flow as it enters the chamber 15 and also to deflect the hot water toward the cold water inlet thereby to introduce the hot water for good mixture with the admitted cold water before the mixed water flows over the power element 25ª. The dam 48, however, does not appreciably restrict the flow of hot water as the flow capacity of the opening therepast is greater than that past the disk valve 43.

Figure 1:
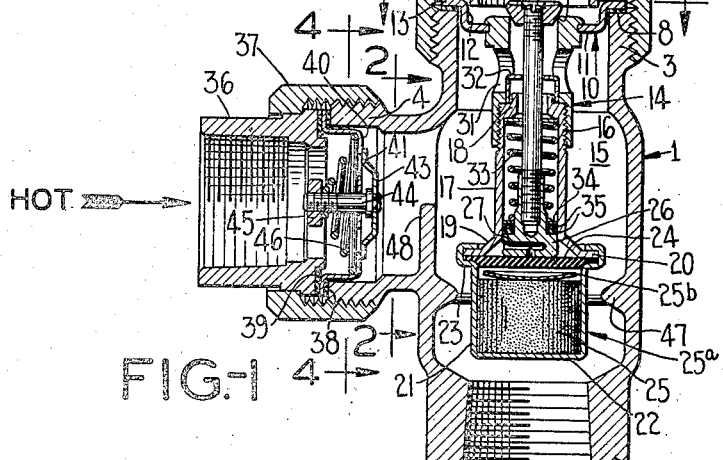
Figure 1 is a view in central vertical section of a water mixing valve embodying the invention.
Figure 4:
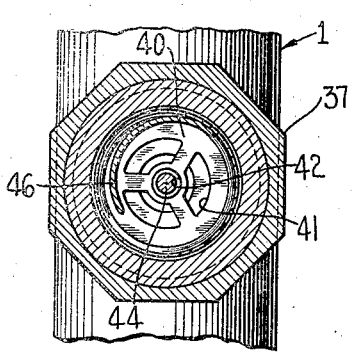
Fig. 4 is a view taken substantially along the line 4—4 of Fig. 1.

The operation of the described water mixing valve is as follows: With the parts in the position as shown in Fig. 1 no water is flowing through the mixing valve. When a demand occurs for hot water in the distributing system supplied by the outlet in the arm 2 of the casing 1, the water pressure in the chamber will be reduced so that the hot water pressure acting on the disk valve 43 will move the valve 43 against the force of the spring 46 to permit flow of hot water through the apertures 41, past the valve 43, and over the dam 48 into the chamber 15 for flow through the opening in the arm 2. The hot water flowing through the leg 4 is hotter than that desired in the hot water distributing system and as it flows against the power element 25ª it causes the pellet 25 to increase in volume due to fusion. This increase in volume forces the diaphragm 24 and piston 26 upward causing the thrust member 28 to move the valve member 29 away from the valve seat 30 to allow cold water to flow into the chamber 15. The hot water flowing into the chamber 15 will be tempered by the cold water flowing into the chamber 15 through the seat 30 and the tempered water will flow over the power element 25ª which acts to allow more or less cold water to flow to maintain the desired temperature of the water being supplied to the hot water distributing system.

At low rates of flow of the tempered water through the outlet in arm 2, the valve 43 will be moved but slightly away from the member 40. The spring 46 opposes movement of the valve 43 away from the member 40 causing a pressure drop across the valve 43. The force exerted by the spring 46 at small openings of the valve 43 is relatively small and therefore the difference in pressure between the chamber and the hot water supply will be small. Because the cold and hot water supplies are at substantially the same pressure, the difference in pressure between that in the cold water supply and the chamber 15 will be small. With a small drop of pressure across the valve 29, the valve 29 may be moved relatively great distances from the seat 30 with only moderate changes in rates of fluid flow therethrough and it may be readily seen that the power element will be subject to less "hunting" due to a too great and then a too small movement of the valve member 29 from the seat 30.

As the demand for tempered water in the hot water distributing system increases, it is necessary for the valve 43 to move further away from the plate member 40 to allow the required flow of hot water. The spring 46 has a high rate of increase of exerted force upon movement of the valve 43 away from the plate member 40 and therefore as the hot water flow increases the pressure within the chamber 15 will decrease relative to that in the hot water supply because of the increased differential in pressure on the valve 43 necessary to overcome the increased force exerted by the spring 46. The drop of pressure in the chamber 15 will also cause an increased differential in pressure between that of the cold water supply and the chamber 15 so that with a given movement of the valve member 29 from its seat 30 a greater flow of cold water into the chamber 15 will result than would result at low flows to the distributing systems and, which greater flow is necessary to temper the greater flow of hot water. In this manner, it is possible to maintain a substantially constant temperature of the water flowing into the distributing system irrespective of the flow volume thereto. Upon a discontinuance of the demand for tempered water, the temperature of the water in the chamber 15 surrounding the element 25ª will decrease and the pellet 25 will return to solid phase and the spring 33 will move the valve member 29 into engagement with its seat 30 shutting off all flow of cold water. The discontinuance of the tempered water demand will also cause an increase in pressure within the chamber 15 and the spring 46 will move the valve 43 against the plate member 40 to prevent any flow of hot water therepast.

It may now be seen that the apparatus shown and described provides a simple, inexpensive and trouble free water mixing valve which is easily manufactured in quantities and which requires very little space for installation. The claimed apparatus also, while being simple, is operable to provide a close temperature regulation of the water supplied to the distributing system irrespective of the volume demand of the system.

What is claimed and is desired to be secured by Letters Patent of the United States is:

1. In an apparatus of the character described, a casing having a chamber with a plurality of inlets and an outlet therefrom, pressure responsive valve means controlling flow through one of said inlets and permitting flow of fluid solely in a direction toward said chamber, spring means acting to hold said valve means in closed position against the pressure of the supplied fluid, said spring means being so constructed and arranged that it has a rapid build up of force upon movement of said valve means toward open position thereby to increase the pressure drop through said one inlet with increase in fluid flow therethrough, a valve member positioned in and controlling flow of fluid through another of said inlets, temperature sensitive means positioned within said chamber and operatively connected to said valve member for controlling the flow of fluid into said chamber, said spring means so loading said valve means as to increase the pressure drop across said other inlet thereby to increase the rate of fluid flow through said other inlet at all positions of said valve member to cause positive temperature control at all rates of fluid flow from said outlet.

2. In a fluid flow controlling device, a hollow T-shaped casing having a chamber and a first inlet through one of the oppositely disposed arms and an outlet through the other of said oppositely disposed arms and a second inlet through the perpendicularly positioned leg, said casing having an annular inwardly extending protuberance positioned intermediate the opening of said second inlet into said chamber and said outlet, a dam member extending across said second inlet and acting to cause a turbulent flow of fluid therefrom into said chamber and to direct the fluid flow toward said first inlet, valve means positioned in said first inlet, temperature sensitive means positioned in said chamber adjacent said outlet and having a cylindrical portion extending within said annular protuberance, said sensitive means being operatively connected to said valve means for operation thereof.

3. In a valve of the character described, a hollow casing having a chamber with an inlet and an outlet for flow of fluid, an annular shelf-like protuberance for directing the fluid flow laterally inward within said chamber and forming a throat positioned adjacent said outlet, valve means controlling flow of the fluid through and positioned in said inlet, a substantially cylindrical temperature sensitive power element positioned within said throat for the lateral impingement of fluid thereagainst from said protuberance, means operatively connecting said element to said valve means, and means for distributing in a laterally outward direction into said chamber the fluid admitted by said valve means.

4. In a valve of the character described, a hollow casing having a chamber with an inlet and an outlet for flow of fluid, an annular shelf-like protuberance within said chamber and forming a throat positioned adjacent said outlet through which the fluid flows, a plate member having an aperture therethrough and positioned across said inlet, means rigidly securing said plate member to said casing, a cylindrical member having one end portion sealed in said aperture and having a central passageway therethrough, the opening of said passageway through said one end portion forming a valve port, a valve member engageable with said one end portion and operable to control fluid flow through said port, said cylindrical member having its opposite end portion extending into said chamber and having an aperture through its side wall communicatively connecting said passageway to said chamber, a substantially cylindrical temperature sensitive power element, a hollow tubular extension on said element and carried by and extending from said cylindrical member opposite end portion, said plate member acting as the sole support for said element and acting to position said element within said throat, and a thrust rod operatively connected to and moved by said element, said rod extending through said extension and said cylindrical member and secured to said valve member for operation thereof by said element.

5. In a valve of the character described, a hollow casing having a chamber with an inlet and an outlet for flow of fluid, an annular shelf-like protuberance within said chamber and forming a throat positioned adjacent said outlet through which the fluid flows, a plate member having an aperture therethrough and positioned across said inlet, means rigidly securing said plate member to said casing, a cylindrical member having one end portion sealed in said aperture and having a central passageway therethrough, the opening of said passageway through said one end portion forming a valve port, a valve member engageable with said one end portion and operable to control fluid flow through said port, said cylindrical member having its opposite end portion extending into said chamber and having an aperture through its side wall communicatively connecting said passageway to said chamber, a substantially cylindrical temperature sensitive power element, a hollow tubular extension on said element and secured to said cylindrical member opposite end portion, said plate member acting as the sole support for said element and acting to position said element within said throat, a thrust rod, an abutment carried by said rod and operatively connected to and moved by said element, said rod extending through said extension and said cylindrical member and secured to said valve member for operation thereof by said element, packing means positioned against said abutment and cooperable with the inner walls of said extension to prevent fluid flow, and a helical coil spring surrounding said rod and having one end portion seating against said packing means, said coil spring being positioned within said extension and opposing movement of said rod by said element.

6. A fluid mixing valve comprising a casing having a chamber with an inlet and an outlet and with a lateral inlet intermediate said inlet and outlet, a dam member obstructing flow into said chamber through said lateral inlet and directing flow toward said first-named inlet, a valve member in and controlling flow through said first-named inlet, temperature responsive means in said chamber and shielded from said lateral inlet by said dam member and operatively connected to said valve member, and a spring-loaded valve member closing against outflow from said chamber and positioned in and resiliently opposing flow through said lateral inlet into said chamber thereby to increase the pressure drop across said first-named inlet.

7. A fluid mixing valve comprising a casing having a chamber with an inlet and an outlet and with a lateral inlet intermediate said inlet and outlet, a tubular supporting member in said first-named inlet and having its inner periphery at its inlet end providing a valve seat and having through its side wall a lateral outlet into said chamber, a temperature responsive power element positioned in said chamber and having a casing secured to the chamber end of said supporting member, a poppet valve engageable with said seat, and a valve stem operatively connecting said element and said poppet valve and extending through said element casing and said supporting member.

8. A fluid mixing valve comprising a casing having a chamber with an inlet and an outlet spaced longitudinally of each other and with a lateral inlet intermediate said inlet and outlet, a recessed annular plate member seating on and closing the inlet end of said casing, a tubular supporting and valve seat member sealed in and extending from the aperture in said plate member into said chamber, said supporting member having the inner periphery of its inlet end providing a valve seat and having a lateral outlet through its side wall into said chamber, a poppet valve seating on said valve seat, a temperature responsive power element positioned in said chamber between said lateral inlet and said outlet, a casing for said power element and secured to the chamber end of said supporting member, and a valve stem extending through said supporting member and operatively connecting said poppet valve and said power element.

9. A fluid mixing valve comprising a casing having a chamber with an inlet and an outlet spaced longitudinally of each other and with a lateral inlet intermediate said inlet and outlet, a recessed annular plate member seating on and closing the inlet end of said casing, a tubular supporting and valve seat member sealed in and extending from the aperture in said plate member into said chamber, said supporting member having the inner periphery of its inlet end providing a valve seat and having a lateral outlet through its side wall into said chamber, a poppet valve seating on said valve seat, a temperature responsive power element positioned in said chamber between said lateral inlet and said outlet, a casing for said power element and secured to the chamber end of said supporting member, a valve stem extending through said supporting member and operatively connecting said poppet valve and said power element, a guide member for said stem and positioned within said supporting member to deflect fluid through said lateral outlet, and means to deflect fluid from said lateral inlet toward the incoming fluid from said lateral outlet.

EARNEST J. DILLMAN.